(12) United States Patent
Sano

(10) Patent No.: US 8,208,657 B2
(45) Date of Patent: Jun. 26, 2012

(54) SIGNAL PROCESSING DEVICE, SIGNAL PROCESSING METHOD, AND PROGRAM

(75) Inventor: Hiroyuki Sano, Tokyo (JP)

(73) Assignee: Sony Corporation, Tokyo (JP)

( * ) Notice: Subject to any disclaimer, the term of this patent is extended or adjusted under 35 U.S.C. 154(b) by 975 days.

(21) Appl. No.: 12/197,475

(22) Filed: Aug. 25, 2008

(65) Prior Publication Data

US 2009/0060223 A1 Mar. 5, 2009

(30) Foreign Application Priority Data

Aug. 27, 2007 (JP) ................................ P2007-219237

(51) Int. Cl.
*H04B 15/00* (2006.01)
(52) U.S. Cl. .................... 381/94.3; 381/94.1; 360/78.04
(58) Field of Classification Search .................. 381/94.1, 381/94.3, 71.1; 704/200
See application file for complete search history.

(56) References Cited

U.S. PATENT DOCUMENTS 5,519,166 A * 5/1996 Furuhashi et al. ............... 84/603
6,897,781 B2 * 5/2005 Cooper et al. ............. 340/573.1
7,636,213 B2 * 12/2009 Cho et al. ......................... 360/46
2003/0147173 A1 * 8/2003 Fujie et al. .................. 360/78.04
2004/0001599 A1 * 1/2004 Etter et al. .................... 381/94.1

FOREIGN PATENT DOCUMENTS

JP 2003 217275 7/2003

* cited by examiner

*Primary Examiner* — Wai Sing Louie
*Assistant Examiner* — Sue Tang
(74) *Attorney, Agent, or Firm* — Frommer Lawrence & Haug LLP; William S. Frommer; Paul A. Levy

(57) ABSTRACT

A signal processing device includes a sound pickup unit configured to pick up sound and convert the sound into a sound signal; a signal recording unit including an actuator that is driven by a current supplied from a power source and that has a possibility of generating audible noise caused by the driving, the signal recording unit being configured to record the sound signal therein; a current detecting unit configured to detect the magnitude of the current and a temporal change in the current; and a signal processing unit configured to determine, on the basis of at least one of the magnitude of the current and the temporal change in the current, whether the audible noise has been generated and perform, when it is determined that the audible noise has been generated, noise removal processing for removing the audible noise from the sound signal, which contains the audible noise.

10 Claims, 7 Drawing Sheets

SIGNAL PROCESSING DEVICE, SIGNAL PROCESSING METHOD, AND PROGRAM

CROSS REFERENCES TO RELATED APPLICATIONS

The present invention contains subject matter related to Japanese Patent Application JP 2007-219237 filed in the Japanese Patent Office on Aug. 27, 2007, the entire contents of which are incorporated herein by reference.

BACKGROUND OF THE INVENTION

1. Field of the Invention

The present invention relates to a signal processing device, a signal processing method, and a program.

2. Description of the Related Art

In recent years, many types of signal recording devices that include a signal recording medium, such as a hard disk drive (HDD), and a microphone and that are configured to record sound or the like picked up by the microphone into the signal recording medium have been released. FIG. 7 shows an example of the configuration of a signal recording device 900. In the signal recording device 900, a sound pickup microphone 901 picks up sound or the like and converts the sound or the like into a digital signal, and a signal processing unit 907 performs appropriate signal processing on the digital signal. Then, under the control of a recording control unit 909, the signal on which the appropriate signal processing has been performed is recorded into an HDD 903, which is a recording medium.

In the case of a device such as the HDD 903, in which an actuator is driven by electric power supplied from a power source 905 so that the HDD 903 can perform various operations, a moving sound caused by driving of the actuator or the like is generated and such a moving sound is picked up as noise by the sound pickup microphone 901. As a result, the sound or the like picked up by the sound pickup microphone 901 contains such a moving sound of the device as noise, and the sound or the like containing the noise is recorded.

In order to solve the above-mentioned problem regarding noise, a noise reduction system for reducing noise generated in an HDD has been built on the assumption that "the operating state of an HDD can be acquired at a position outside the HDD" and a method for reducing noise generated in the HDD has been proposed (see, for example, Japanese Unexamined Patent Application Publication No. 2003-217275). In addition, Japanese Unexamined Patent Application Publication No. 2003-217275 describes a feature that a time during which noise is generated can be detected by extracting, with a sound pickup microphone attached to an HDD, noise generated in the HDD.

SUMMARY OF THE INVENTION

It is difficult, however, to know operating states of the HDD devices among developers in the field of development of the other devices, who are not vendors of such HDD devices. Thus, the method described in Japanese Unexamined Patent Application Publication No. 2003-217275 can only be applied to limited cases.

In addition, in the method described in Japanese Unexamined Patent Application Publication No. 2003-217275, it is necessary that a microphone for picking up noise generated in an HDD be provided in a signal recording device. Thus, the cost of the signal recording device increases. In addition, it is not easy to discriminate between noise and an external sound with respect to a signal received at the microphone. Thus, a failure of detection of noise, false detection of noise, or the like may cause a failure in noise removal or excessive noise processing. As a result, the sound quality may be degraded.

It is desirable to provide a signal processing device, a signal processing method, and a program capable of estimating, without leading to a cost increase, a time during which a moving sound caused by driving of a signal recording medium is generated.

According to an embodiment of the present invention, there is provided a signal processing device including a sound pickup unit configured to pick up sound and convert the sound into a sound signal; a signal recording unit including an actuator that is driven by a current supplied from a power source and that has a possibility of generating audible noise caused by the driving, the signal recording unit being configured to record the sound signal therein; a current detecting unit configured to detect the magnitude of the current supplied to the signal recording unit and a temporal change in the current supplied to the signal recording unit; and a signal processing unit configured to determine, on the basis of at least one of the detected magnitude of the current and the detected temporal change in the current, whether the audible noise has been generated and perform, when it is determined that the audible noise has been generated, noise removal processing for removing the audible noise from the sound signal, which contains the audible noise.

According to this configuration, the sound pickup unit picks up sound and converts the sound into a sound signal, the signal recording unit records the sound signal therein, the current detecting unit detects the magnitude of the current supplied to the signal recording unit and a temporal change in the current supplied to the signal recording unit, and the signal processing unit determines, on the basis of at least one of the detected magnitude of the current and the detected temporal change in the current, whether the audible noise has been generated, and performs, when it is determined that the audible noise has been generated, noise removal processing for removing the audible noise from the sound signal, which contains the audible noise. The signal processing device is capable of estimating, by measuring a temporal change in the current supplied to the signal recording unit, a time during which a moving sound caused by driving of the signal recording unit, which is a signal recording medium, is generated.

The signal processing unit may determine, on the basis of a determination of whether a waveform indicating the detected temporal change in the current has a specific shape, whether the audible noise has been generated.

The signal processing unit may fix, on the basis of a time at which the waveform having the specific shape is detected, a removal processing start time at which the noise removal processing is started, and perform the noise removal processing on the sound signal containing the audible noise after the removal processing start time.

The signal processing unit may include a buffer in which the sound signal is stored for a predetermined period of time, and, in a case that the removal processing start time is set before the time at which the waveform having the specific shape has been detected, perform the noise removal processing on the stored sound signal in the buffer.

The signal processing unit may include a processing detail storing part in which details of the noise removal processing corresponding to the waveform having the specific shape are stored in association with the waveform having the specific shape, and change, in accordance with the detected waveform having the specific shape, the details of the noise removal processing to be performed on the sound signal containing the audible noise.

The length of a period during which the noise removal processing is to be performed being stored, in association with the waveform having the specific shape, in the processing detail storage part, the signal processing unit may perform the noise removal processing during from the removal processing start time to an end time of the period for the noise removable processing to be performed.

The signal processing unit may remove, from the sound signal containing the audible noise, a signal component having a specific frequency by using one of a low-pass filter, a high-pass filter, and a band-pass filter.

The signal processing unit may replace a portion of the sound signal containing the audible noise with a portion that is different from the portion of the sound signal containing the audible noise.

According to another embodiment of the present invention, there is provided a signal processing method for removing, from a sound signal recorded in a signal recording unit including an actuator that is driven by a current supplied from a power source and that has a possibility of generating audible noise caused by the driving, the audible noise, includes the steps of picking up sound and converting the sound into the sound signal; detecting the magnitude of the current supplied to the signal recording unit and a temporal change in the current supplied to the signal recording unit; and determining, on the basis of at least one of the detected magnitude of the current and the detected temporal change in the current, whether the audible noise has been generated and removing, when it is determined that the audible noise has been generated, the audible noise from the sound signal, which contains the audible noise.

In each step according to this configuration; sound is picked up and the sound is converted into a sound signal, the magnitude of a current supplied to the signal recording unit and a temporal change in the current supplied to the signal recording unit are detected, it is determined whether, on the basis of at least one of the detected magnitude of the current and the detected temporal change in the current, the audible noise has been generated or not, and when it is determined that the audible noise has been generated, the audible noise is removed from the sound signal, which contains the audible noise. The signal processing method is capable of estimating, by measuring a temporal change in the current supplied to the signal recording unit, a time during which a moving sound caused by driving of the signal recording unit, which is a signal recording medium, is generated.

According to still another embodiment of the present invention, a program for causing a computer to function as a signal processing device configured to remove, from a sound signal recorded in a signal recording unit including an actuator that is driven by a current supplied from a power source and that has a possibility of generating audible noise caused by the driving, the audible noise, includes the functions of picking up sound and converting the sound into the sound signal; detecting the magnitude of the current supplied to the signal recording unit and a temporal change in the current supplied to the signal recording unit; and determining, on the basis of at least one of the detected magnitude of the current and the detected temporal change in the current, whether the audible noise has been generated and removing, when it is determined that the audible noise has been generated, the audible noise from the sound signal, which contains the audible noise.

With this configuration, the computer program causes a computer to function as the above-described signal processing device when the computer program is stored in a storing unit provided in the computer and is read and written into and executed by a central processing unit (CPU) of the computer. In addition, a computer-readable recording medium in which the computer program is recorded can be provided. The recording medium is, for example, a magnetic disk, an optical disk, a magneto-optical disk, or a flash memory. In addition, the computer program is not necessarily recorded in the recording medium. For example, the computer program may be distributed via a network.

According to an embodiment of the present invention, by measuring a temporal change in the current supplied to the signal recording medium, a time during which a moving sound caused by driving of the signal recording medium is generated can be estimated, without leading to a cost increase.

DESCRIPTION OF THE PREFERRED EMBODIMENTS

Figure 1:
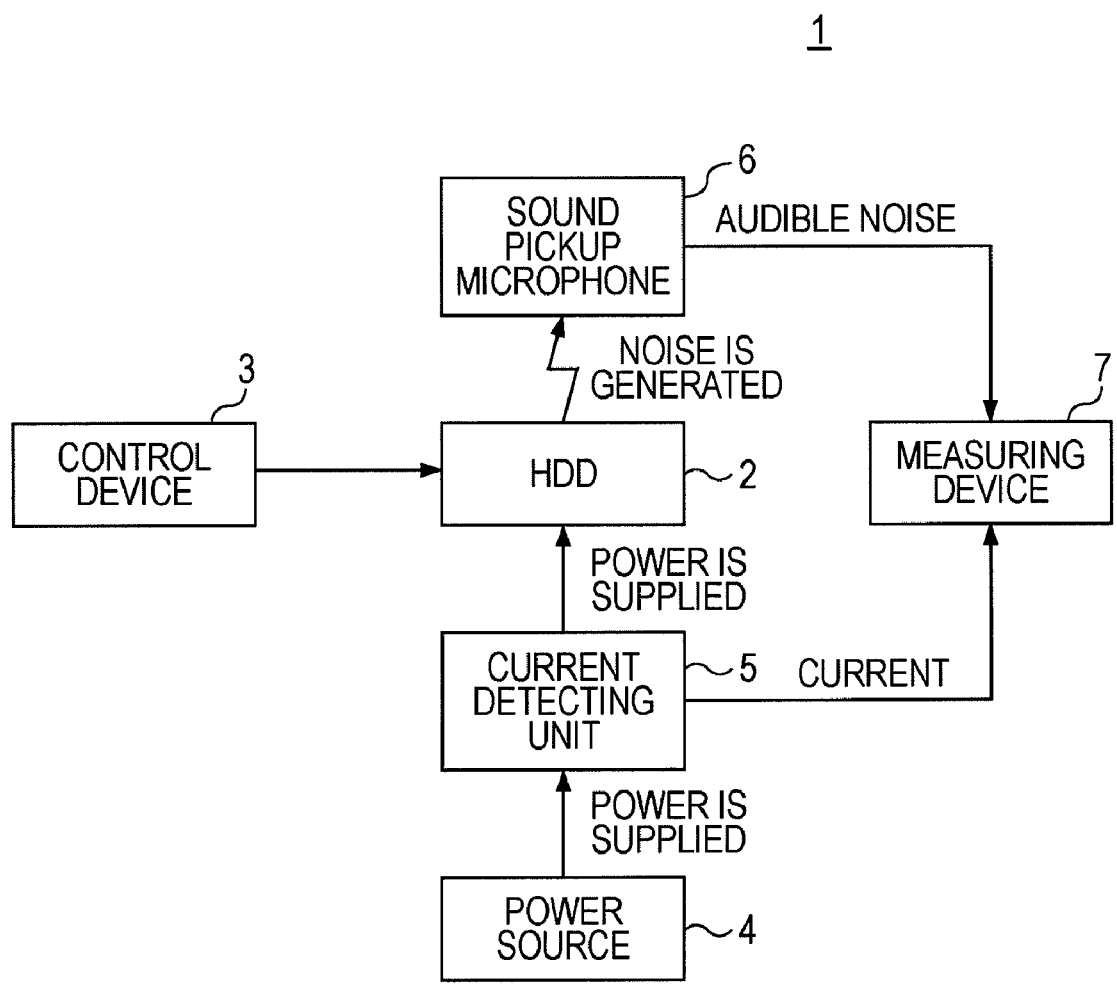
FIG. 1 is a block diagram showing a measuring system for recording noise generated in a signal recording unit.

Preferred embodiments of the present invention will be described hereinafter with reference to the drawings. In the specification and the drawings, in order to avoid redundant explanations, components having substantially the same functional configuration are denoted by the same reference numeral.

Figure 2:
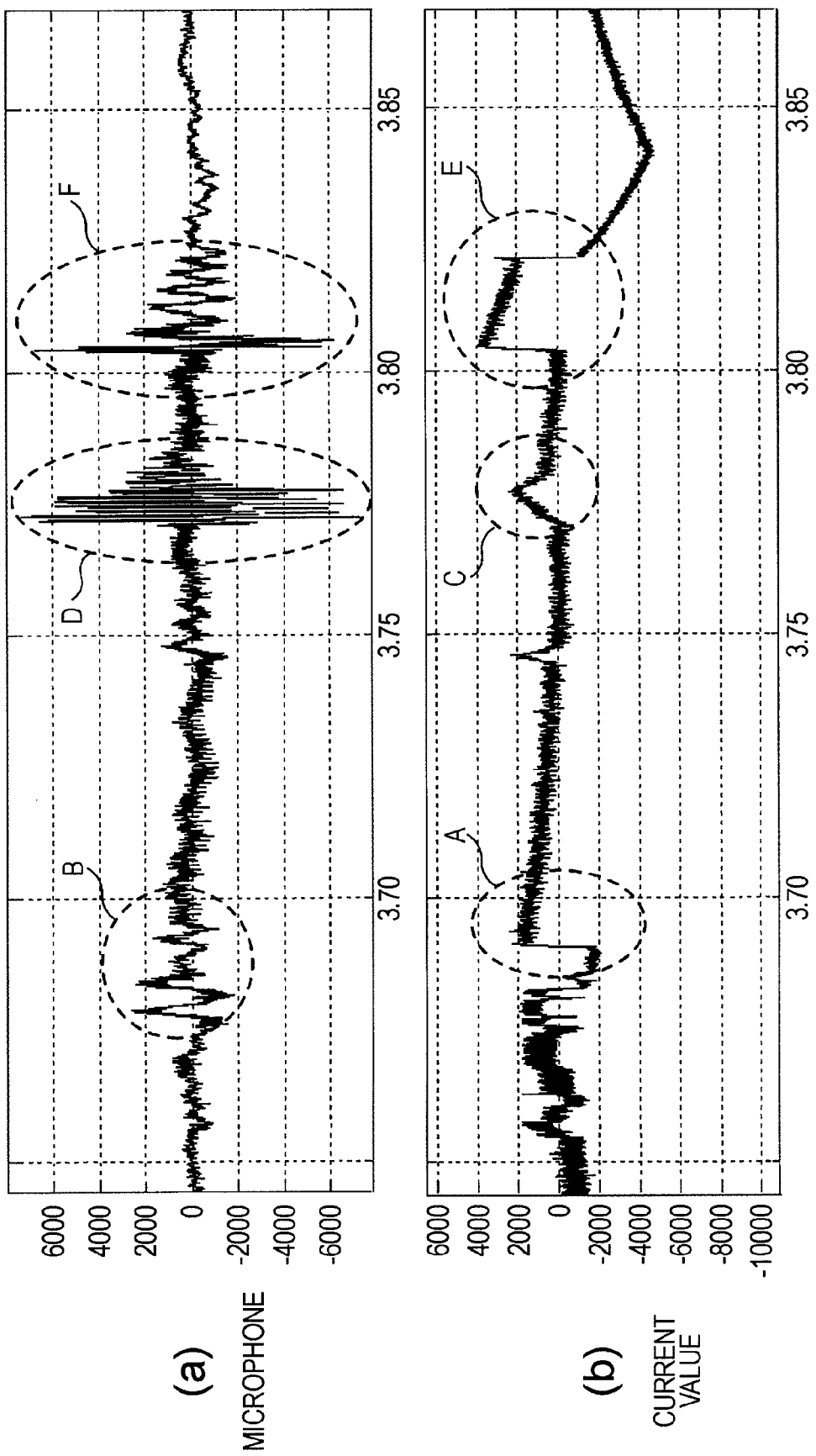
FIG. 2 includes graphs showing a current supplied to the signal recording unit and noise generated in the signal recording unit.

Before describing a signal processing device according to an embodiment of the present invention, the relationship between a current supplied to an HDD, which is an example of a signal recording unit, and noise generated in the HDD will be described with reference to FIGS. 1 and 2. FIG. 1 is a block diagram showing a measuring system for measuring a current supplied to the HDD and measuring noise generated in the HDD. FIG. 2 includes graphs showing a current and noise measured by the measuring system shown in FIG. 1.

Referring to FIG. 1, a measuring system 1 includes an HDD 2, a control device 3, a power source 4, a current detecting unit 5, a sound pickup microphone 6, and a measuring device 7.

The HDD 2 is an example of a signal recording unit including an actuator that is driven by a current supplied from the power source 4 and that has a possibility of generating audible noise caused by the driving. The power source 4 supplies to the HDD 2 electric power necessary for various operations of the HDD 2.

The control device 3 controls the HDD 2. The control device 3 issues various control commands that are likely to be used in a device in which the HDD 2 is to be installed. The device in which the HDD 2 is to be installed is, for example, a device such as a camcorder or an HDD recorder, in which a sound pickup microphone and an HDD are provided. Since the control device 3 issues various control commands that are likely to be used in a device in which the HDD 2 is to be installed, a current supplied when the HDD 2 executes a control command and audible noise generated in the HDD 2, in association with each other, can be identified.

The power source 4 supplies electric power to the HDD 2 so that the HDD 2 can be driven. The current detecting unit 5 for detecting the magnitude of a current supplied to the HDD 2 is provided in a channel through which electric power is supplied to the HDD 2. The current detecting unit 5 is capable of detecting the magnitude of a current supplied from the power source 4 to the HDD 2 when the HDD 2 executes a control command.

The sound pickup microphone 6 picks up sound and converts the sound into a sound signal. In the measuring system 1, the sound pickup microphone 6 is provided in such a manner that the positional relationship between the HDD 2 and the sound pickup microphone 6 in a device in which the HDD 2 is to be installed can be simulated. The sound pickup microphone 6 picks up audible noise generated when the HDD 2 executes a control command.

The measuring device 7 indicates a current detected by the current detecting unit 5 and audible noise picked up by the sound pickup microphone 6. The measuring device 7 measures a temporal change in the current supplied when the HDD 2 executes a control command and a temporal change in the audible noise generated in the HDD 2. The measuring device 7 includes, for example, an oscilloscope.

With use of the results obtained by the measuring system 1, a status of current supply and audible noise that are likely to occur in a device in which the HDD 2 is to be installed can be obtained as a database.

FIG. 2 shows an example of a current value and audible noise measured by the measuring system 1. Part (a) of FIG. 2 is a graph showing a temporal change in the audible noise generated in the HDD 2. Part (b) of FIG. 2 is a graph showing a temporal change in the value of a current supplied to the HDD 2. In part (a) of FIG. 2, the abscissa represents time (second) and the ordinate represents the volume of audible noise. In part (b) of FIG. 2, the abscissa represents time (second) and the ordinate represents the value of a current.

As is clear from parts (a) and (b) of FIG. 2, in the case that a current of a predetermined absolute value or more is supplied from the power source 4 to the HDD 2 at a certain time, audible noise is generated in the HDD 2 before and/or after the certain time. This indicates that there is a correlation between the current supplied from the power source 4 to the HDD 2 and the audible noise generated by driving of the HDD 2. For example, in a case where a current value suddenly changes at points A and E in part (b) of FIG. 2 and a case where an increase in the current value is turned into a decrease at point C in part (b) of FIG. 2, characteristic noises are generated at points B, D, and F in part (a) of FIG. 2. As described above, waveforms indicating temporal changes in the current at points A, C, and E in part (b) of FIG. 2 represent characteristic waveforms that are relevant to generation of audible noises. In addition, when attention is paid to the absolute value of a current, a steady operating state (for example, presence or absence of spindle rotation of the HDD 2) can be inferred. The above-described "characteristic waveform" represents a waveform that is detected in terms of a temporal change in the current value and that is highly correlated with generation of audible noise.

Concerning a characteristic current waveform shown in FIG. 2, since an input into the sound pickup microphone 6 reacts to a current waveform, the characteristic current waveforms are extracted from measurement results and it is identified that status of the each current, change in the each current, and further what kind of change in the motion of the HDD 2 cause which type of noise. For example, by analyzing a current waveform detected when the control device 3 transmits a certain control signal, the fact that the waveforms obtained at points A and E in part (b) of FIG. 2 occur when a spindle motor is driven to rotate a disk of the HDD 2 can be found out. And by performing similar analysis, the fact that the waveform obtained at point C in part (b) of FIG. 2 occurs when servo-control is performed in order to move aside (retract) the head of the HDD 2 or to perform seeking can be found out.

As is clear from a comparison between part (a) of FIG. 2 and part (b) of FIG. 2, there are some cases where a current supply start time is not the same as a time at which generation of noise is started and there are some cases where a current supply end time is not the same as a time at which generation of noise is ended. Thus, by examining, in accordance with a method such as pattern learning, the correlation between a time in which a characteristic waveform indicating a temporal change in the current supplied to the HDD 2 is detected and a time in which audible noise is picked up, a removal processing start time at which signal processing for removing audible noise from a sound signal is started and a period during which the signal processing is to be performed can be determined on the basis of the characteristic current waveform.

Thus, by detecting a time (a point in time) at which the above-described characteristic waveform is detected as a waveform indicating a temporal change in the current supplied from the power source 4 to the HDD 2, a time at which noise is mixed on sound picked up by the sound pickup microphone 6 can be estimated. Moreover, a time at which processing for removing audible noise is started and a period during which the signal processing is to be performed can be determined.

In addition, a signal processing algorithm optimal for the type of audible noise can be determined by examining a signal processing method for removing audible noise from a sound signal on the basis of a result of detection of audible noise. By examining the graphs shown in FIG. 2, appropriate processing can be selected. For example, as processing for removing audible noise caused by a spindle motor, processing for removing a frequency corresponding to the number of rotations of the motor by using a notch filter or the like is selected. In addition, for example, as processing for removing audible noise caused by retraction or seeking of a disk, processing for replacing a portion of a sound signal containing the audible noise with a portion having a similar waveform before and/or after the portion containing the noise is selected.

By performing the above-described examinations on the HDD 2 or the like that is to be installed, a database in which a characteristic waveform indicating a temporal change in the current, information on the operating state of the HDD 2 when the characteristic waveform is detected, a removal processing start time at which processing for removing audible noise is started, a period during which the signal processing is to be performed, and a signal processing method to be used for removing the audible noise are associated with each other can be created.

First Embodiment

Figure 3:
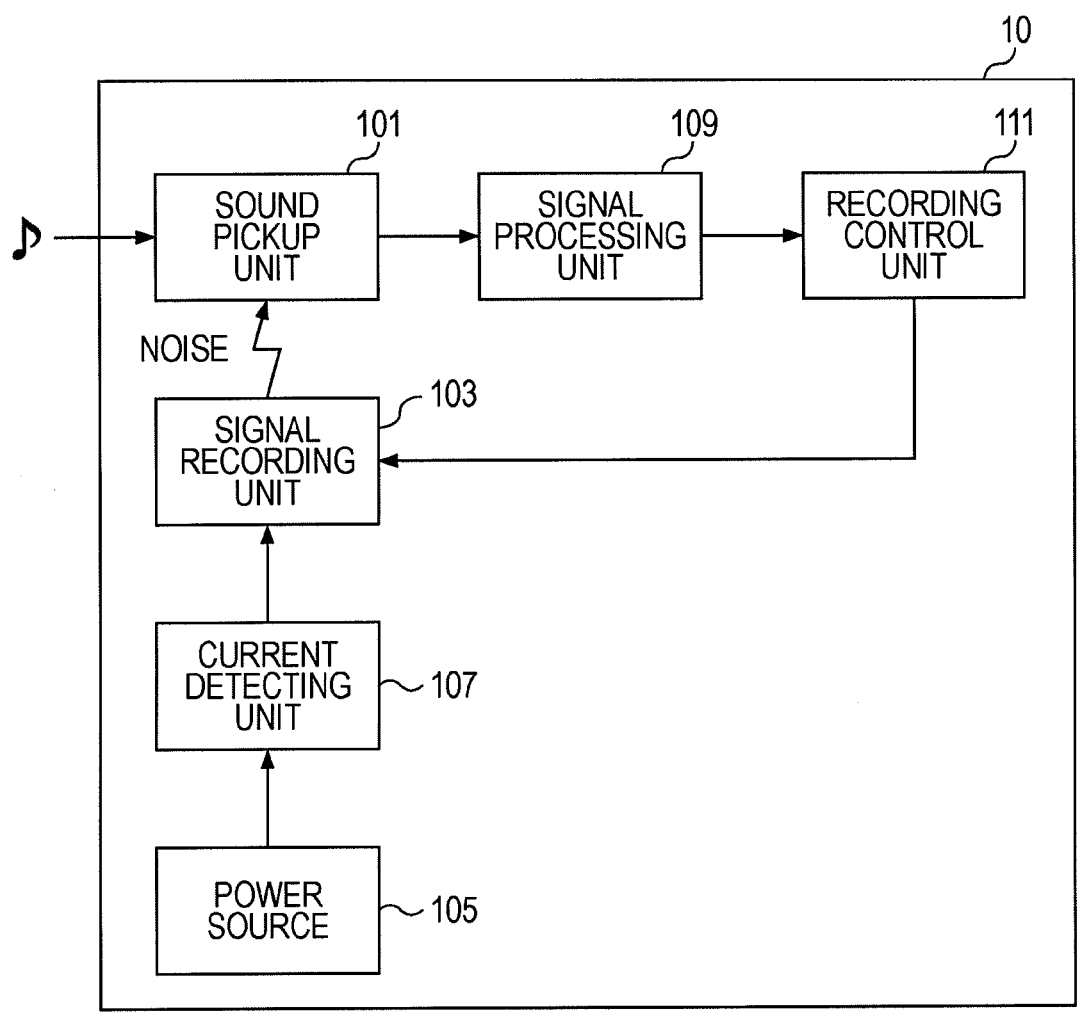
FIG. 3 is a block diagram showing a signal processing device according to a first embodiment of the present invention.
Figure 4:
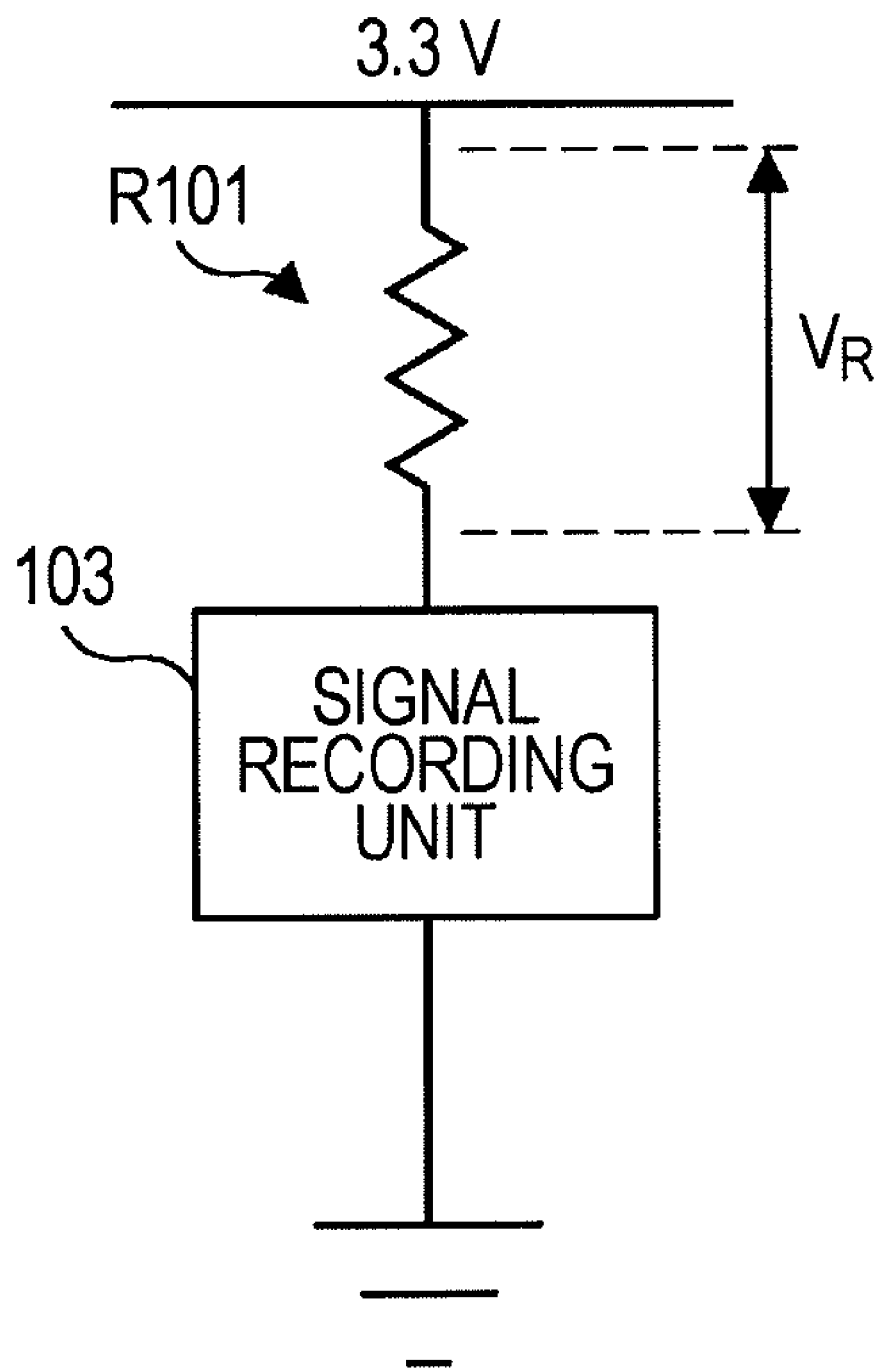
FIG. 4 is an explanatory diagram for explaining an example of a current detecting unit used in the embodiment.
Figure 5:
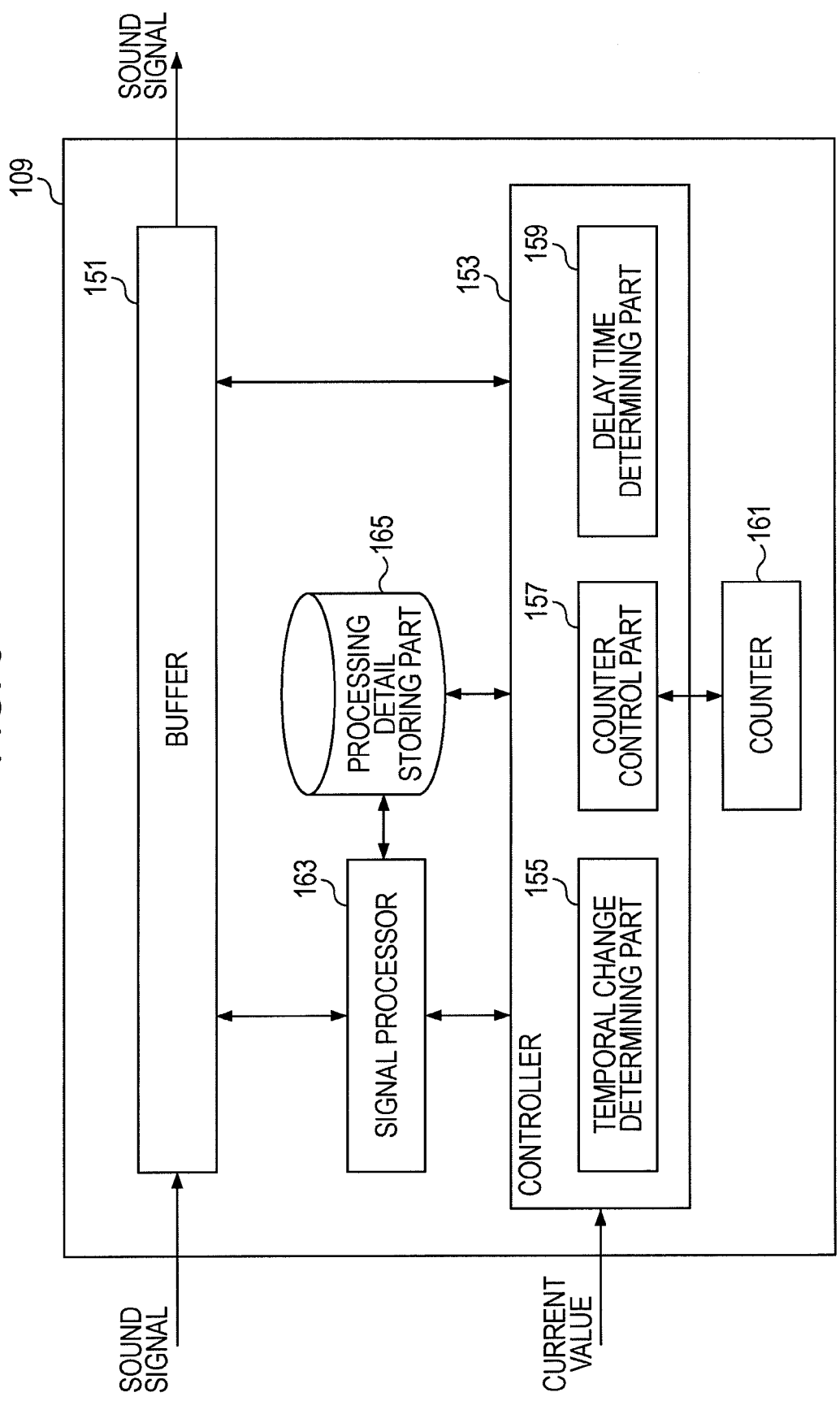
FIG. 5 is a block diagram showing a signal processing unit used in the embodiment.

A signal processing device 10 according to a first embodiment of the present invention will be described with reference to FIGS. 3 to 5. FIG. 3 is a block diagram showing the signal processing device 10 according to this embodiment. FIG. 4 is an explanatory diagram for explaining an example of a current detecting unit used in this embodiment. FIG. 5 is a block diagram showing a signal processing unit used in this embodiment.

Referring to FIG. 3, the signal processing device 10 according to this embodiment mainly includes a sound pickup unit 101, a signal recording unit 103, a power source 105, a current detecting unit 107, a signal processing unit 109, and a recording control unit 111.

The sound pickup unit 101 includes, for example, a sound pickup microphone and an analog-to-digital (A/D) converter. The sound pickup unit 101 picks up sound and converts the sound into a digital sound signal. The term "sound" includes various types of sounds including a voice, music, an effect sound, and an imitation sound. A general AD converter may be used as the AD converter provided in the sound pickup unit 101 used in this embodiment.

The sound signal generated by the sound pickup unit 101 is recorded into the signal recording unit 103. The signal recording unit 103 includes an actuator that is driven by a current supplied from the power source 105 and that may generate audible noise caused by the driving. The signal recording unit 103 used in this embodiment may be, for example, an optical drive for a compact disc (CD) medium, a digital versatile disc (DVD) medium, a Blu-ray medium, or an HD-DVD medium, or an HDD. Although a case where the signal recording unit 103 is an HDD will be described by way of example, the signal recording unit 103 used in an embodiment of the present invention is not necessarily limited to an HDD.

The power source 105 supplies to the signal recording unit 103 a current that is electric power for driving the signal recording unit 103. The current detecting unit 107 is provided in a line between the power source 105 and the signal recording unit 103. The current detecting unit 107 detects the magnitude of a current supplied from the power source 105 to the signal recording unit 103 and a temporal change in the current supplied from the power source 105 to the signal recording unit 103.

For example, as shown in FIG. 4, a resistor R101 may be provided, as the current detecting unit 107, in series to the signal recording unit 103, which is grounded. The resistor R101 has a resistance of, for example, about 0.1Ω. In a case where the correlation between a voltage applied to the resistor R101 and a current flowing through the resistor R101 in accordance with the applied voltage is examined in advance, a voltage $V_R$ applied across the resistor R101 is detected, so that the current flowing through the resistor R101 and a temporal change in the current flowing through the resistor R101 can be measured. The current detecting unit 107 used in this embodiment is not necessarily limited to the above-described example. The current detecting unit 107 can employ any method as long as the magnitude of the current supplied to the signal recording unit 103 and a temporal change in the current supplied to the signal recording unit 103 can be measured in accordance with the method.

The signal processing unit 109 determines, on the basis of the magnitude of the current and a temporal change in the current detected by the current detecting unit 107, whether audible noise caused by a driving sound or the like of the signal recording unit 103 has been generated. If it is determined that audible noise has been generated, the signal processing unit 109 removes audible noise from a sound signal containing the audible noise. The signal processing unit 109 used in this embodiment does not constantly perform signal processing on sound signals generated by the sound pickup unit 101. The signal processing unit 109 performs appropriate signal processing only when it is determined that audible noise has been generated. The signal processing unit 109 will be described in more detail later.

The recording control unit 111 performs control for recording, into the signal recording unit 103, a sound signal output from the signal processing unit 109.

The signal processing unit 109 used in this embodiment will be described in more detail with reference to FIG. 5. Referring to FIG. 5, the signal processing unit 109 includes a buffer 151, a controller 153, a counter 161, a signal processor 163, and a processing detail storing part 165.

The buffer 151 includes, for example, a random-access memory (RAM). A sound signal generated by the sound pickup unit 101 is input to the buffer 151. The sound signal input to the buffer 151 is held in the buffer 151 for a predetermined period of time. That is, a sound signal and a time at which the sound signal is input to the buffer 151 are recorded in association with each other in the buffer 151. The sound signal is stored in the buffer 151 during a predetermined short period of time. The period during which a sound signal is temporarily stored in the buffer 151 is, for example, about several milliseconds. As described above, audible noise caused by driving of the signal recording unit 103 may be generated before a waveform having a specific shape is detected as a waveform indicating a temporal change in the current value. Thus, with the provision of the buffer 151, a case where it is necessary for removing audible noise generated in the past can be handled. In addition, after the predetermined short period of time has passed, the sound signal is output from the buffer 151 to the recording control unit 111.

The controller 153 includes, for example, a central processing unit (CPU), a read-only memory (ROM), and a RAM. The controller 153 controls processing for removing audible noise to be performed by the signal processing unit 109. The magnitude of a current supplied from the power source 105 to the signal recording unit 103 and a temporal change in the current supplied from the power source 105 to the signal recording unit 103 are detected by the current detecting unit 107 and results of the detection are input to the controller 153. The controller 153 used in this embodiment includes a temporal change determining part 155, a counter control part 157, and a delay time determining part 159.

The temporal change determining part 155 includes, for example, a CPU, a ROM, and a RAM. The temporal change determining part 155 determines, on the basis of a detection result obtained by the current detecting unit 107, whether a waveform indicating a temporal change in the current has a correlation with generation of audible noise. The temporal change determining part 155 refers to a database stored in the processing detail storing part 165. If it is determined that generation of audible noise has been inferred or that audible noise has already been generated, the temporal change determining part 155 notifies the counter control part 157, the delay time determining part 159, the signal processor 163, and the like of a result of the determination. As described above, in the signal processing device 10 according to an embodiment of the present invention, a state in which a waveform having a specific shape is detected as a waveform indicating a temporal change in the current value input from the current detecting unit 107, is used as a trigger for starting audible noise removal processing.

The counter control part 157 includes, for example, a CPU, a ROM, and a RAM. The counter control part 157 controls the counter 161. In the case that the temporal change determining part 155 detects a characteristic waveform indicating a temporal change in the current, if audible noise is generated after a predetermined period of time has passed since the detection of the characteristic waveform, the counter control part 157 causes the counter 161 to start counting processing at the time when the waveform is detected, and controls the counter 161 in accordance with the detected characteristic waveform until the predetermined period of time has passed. When the signal processor 163 starts appropriate audible noise removal processing, the counter 161 measures a period of time during which the signal processor 163 performs the noise removal processing. After the counter 161 measures the predetermined period of time, the counter control part 157 notifies the signal processor 163 of the fact that the predetermined period of time has passed.

The delay time determining part 159 includes, for example, a CPU, a ROM, and a RAM. In the case that the temporal change determining part 155 detects a characteristic waveform indicating a temporal change in the current, if audible noise is generated before the detection of the characteristic waveform, the delay time determining part 159 determines a time difference (time delay) between a time during which audible noise was generated and a time during which the characteristic waveform was detected. That is, the delay time represents a time indicating how much a time at which a characteristic waveform indicating a temporal change in the current has been detected is delayed relative to a time at which audible noise was generated.

The delay time determining part 159 refers to the processing detail storing part 165 to search for data content associated with the waveform detected by the temporal change determining part 155 and determines a delay time. After determining the delay time, the delay time determining part 159 selects an address indicating data stored before a necessary time in the buffer 151 and notifies the signal processor 163 of the selected address. Alternatively, the delay time determining part 159 may directly transmit, to the signal processor 163, a sound signal acquired from the buffer 151.

The counter 161 includes, for example, a CPU, a ROM, a RAM, and a logic element such as a flip-flop. The counter 161 measures time in accordance with a control instruction issued from the counter control part 157.

The signal processor 163 includes, for example, a CPU, a ROM, and a RAM. After the temporal change determining part 155 detects a characteristic waveform indicating a temporal change in the current, the signal processor 163 removes mixed audible noise from a sound signal stored in the buffer 151 while referring to a database or the like stored in the processing detail storing part 165. Noise removal processing to be performed by the signal processor 163 is stored, in association with a characteristic waveform indicating a temporal change in the current, in the processing detail storing part 165. In accordance with the detected characteristic waveform, the signal processor 163 changes the noise removal processing to be performed and a time during which the noise removal processing is to be performed.

In the case that audible noise is generated after a predetermined period of time has passed since the detection of a characteristic waveform, the signal processor 163 performs, after receiving from the counter control part 157 information indicating that the predetermined period of time has passed, noise removal processing. In the case that audible noise is generated before the detection of a characteristic waveform, the signal processor 163 acquires a past sound signal on the basis of an address in the buffer 151 notified by the delay time determining part 159 and performs noise removal processing on the acquired past sound signal. As described above, with the use of outputs from the counter control part 157 and the delay time determining part 159, even if a time during which audible noise is generated is before or after a time during which a characteristic current waveform is detected, noise removal processing can be applied for a specific time period.

For example, with respect to audible noise regarding a spindle of a disk constituting the signal recording unit 103, the signal processor 163 used in this embodiment performs processing for removing a predetermined frequency component by using a notch filter, such as a low-pass filter, a high-pass filter, or a band-pass filter. The frequency component to be removed corresponds to the number of rotations of a spindle motor. In addition, with respect to audible noise regarding retraction or seeking of a disk, the signal processor 163 is capable of performing processing for replacing a portion of a sound signal inferred to contain audible noise with a portion adjacent to the portion of the sound signal inferred to contain the audible noise. For example, the signal processor 163 is capable of extracting a section having a similar waveform from a portion adjacent to a portion of a sound signal inferred to contain the audible noise, so that the portion of the sound signal inferred to contain the audible noise can be replaced with the extracted section having the similar waveform.

After performing the noise removal processing, the signal processor 163 outputs to the buffer 151 the sound signal not containing audible noise.

As described above, only when a characteristic waveform indicating a temporal change in the current is detected and generation of audible noise is thus inferred, the signal processor 163 used in this embodiment performs noise removal processing on a portion of a sound signal in which generation of audible noise is inferred. Thus, noise removal processing to be performed on a sound signal can be minimized, thereby suppressing a reduction in the sound quality of the sound signal.

The processing detail storing part 165 includes, for example, a recording unit such as a ROM or an HDD. And in the processing detail storing part 165, a characteristic waveform detected in terms of a temporal change in the current supplied to the signal recording unit 103 and a signal processing method to be used for removing, from a sound signal, audible noise caused by the current supply corresponding to this characteristic waveform and generated in the signal recording unit 103 are stored, in association with each other, for example, in the form of a database. In addition, information defining a removal processing start time, which is a time at which processing for removing audible noise is started (that is, for example, information indicating how long time it is necessary to go back in order to start the processing or information indicating how long a period has to elapse before starting the processing), and information regarding a period during which the signal processing is to be performed are stored in the processing detail storing part 165.

Databases regarding the above-described processing are individually created, for example, by the measuring system 1 described above with reference to FIG. 1, in accordance with the signal recording unit 103 to be installed in the signal processing device 10. In the case that a plurality of types of signal recording units 103 to be installed in the signal processing device 10 exist, the databases may be created for the signal recording units 103 to be installed and all the possible databases may be stored in the processing detail storing part 165. In the case that a plurality of types of databases are stored in the processing detail storing part 165, IDs may be allocated to the individual databases. In the case that a signal recording unit 103 to be installed is fixed, a corresponding database can be designated in terms of hardware or software.

A database stored in the processing detail storing part 165 can be updated, when necessary, via a recording medium of any type or a network such as the Internet.

The present operating state of the signal recording unit 103 is stored in the signal processing unit 109 used in this embodiment. Thus, for example, in a case where times of a transition to a rotation start state and a transition to a rotation stop state can be inferred on the basis of a current waveform, it can be inferred that a disk is rotating during a period between the rotation start time and the rotation stop time. Thus, instead of a fixed certain period, all the sections between the rotation start time and the rotation stop time can be set as a time in which noise removal processing is to be performed. Accordingly, not only unexpected noise caused by a state transition but also steady-state noise can be removed.

An example of the function of the signal processing device 10 according to this embodiment has been described above. The above-described components may be general-purpose members or circuits. Alternatively, the above-described components may be hardware specialized for individual functions of the above-described components. Thus, the configuration of the signal processing device 10 may be changed in an appropriate manner in accordance with a technical level in a case where this embodiment is implemented.

Figure 6:
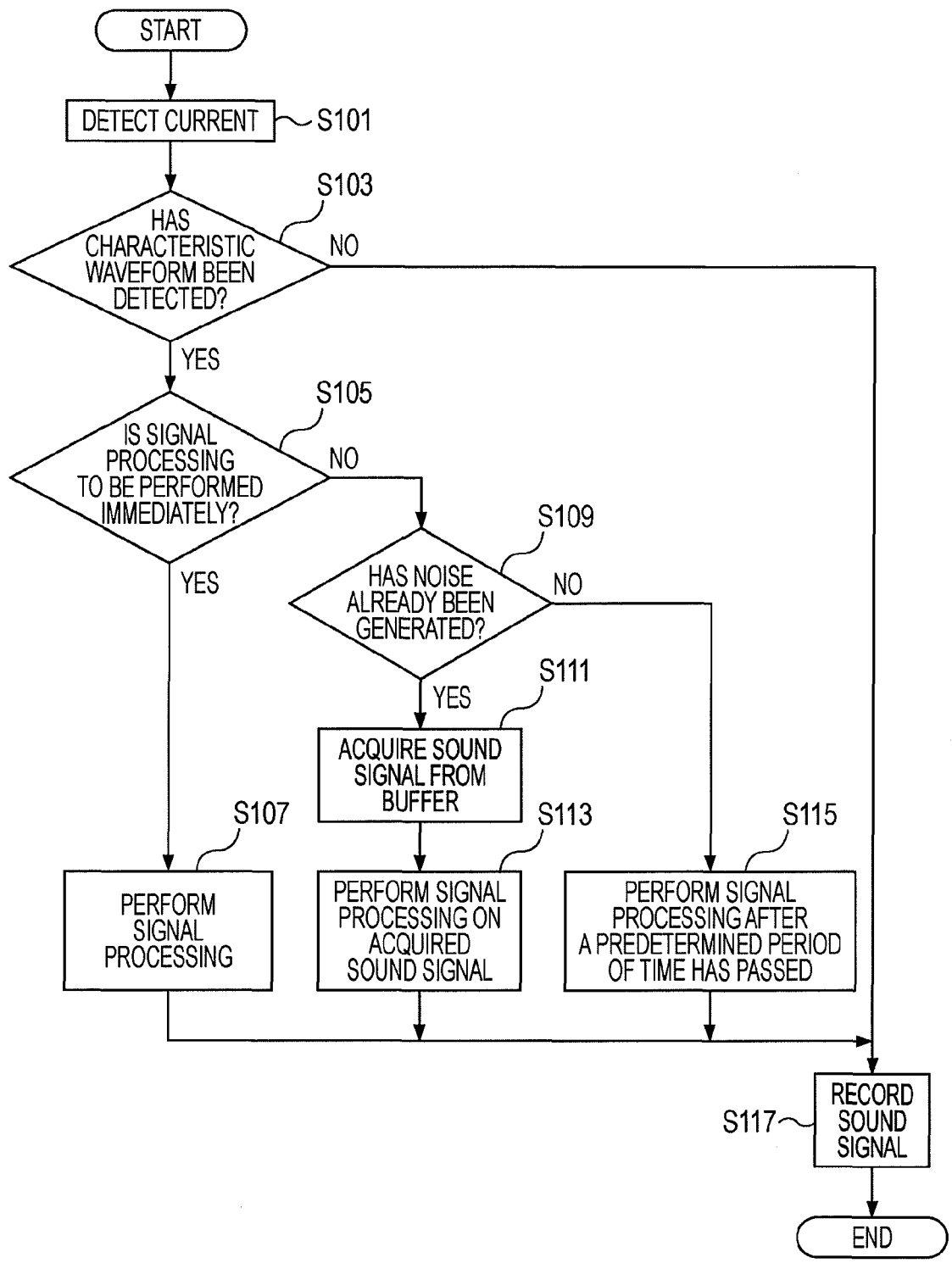
FIG. 6 is a flowchart showing the process of a signal processing method according to an embodiment of the present invention.
Figure 7:
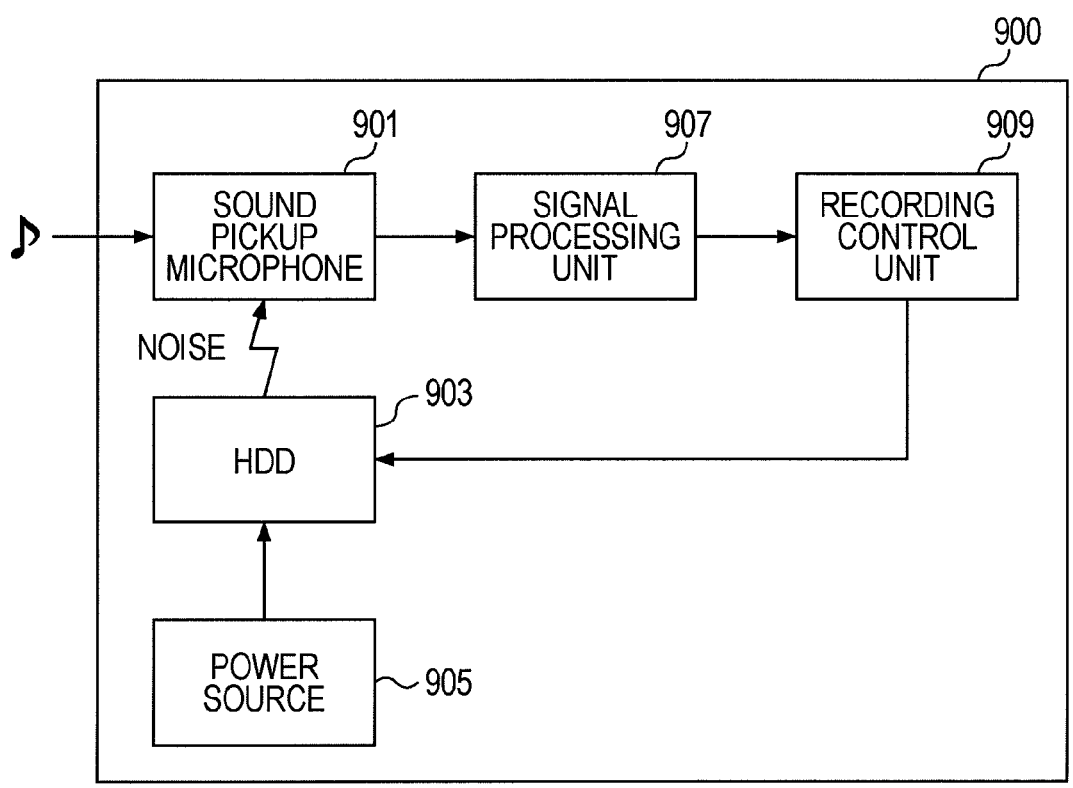
FIG. 7 is an explanatory diagram showing a signal recording device of the related art.

A signal processing method according to an embodiment will be described with reference to FIG. 6. FIG. 6 is a flowchart showing the process of a signal processing method according to this embodiment.

Referring to FIG. 6, the current detecting unit 107 detects the magnitude of a current supplied to the signal recording unit 103 and a temporal change in the current supplied to the signal recording unit 103 (step S101). The current detecting unit 107 outputs, to the signal processing unit 109, information regarding the detected temporal change in the current. The temporal change determining part 155 of the signal processing unit 109 determines whether a characteristic waveform stored in the processing detail storing part 165 exists as the waveform indicating the temporal change in the current (step S103).

If it is determined that the characteristic waveform does not exist, the signal processor 163 records a sound signal into the signal recording unit 103, without performing noise removal processing, and ends the process (step S117).

If it is determined that the characteristic waveform exists (that is, generation of audible noise is inferred), the temporal change determining part 155 notifies the signal processor 163 of a result of the determination. The signal processor 163 determines, by checking the processing detail storing part 165 for the detected waveform, whether to immediately perform noise removal processing (step S105).

If it is determined, in accordance with a result of checking for the detected waveform, that information indicating that a removal processing start time corresponds to a time at which the characteristic waveform is detected is stored, the signal processor 163 immediately performs signal processing in accordance with a signal processing method stored in the processing detail storing part 165 (step S107).

If it is determined, in accordance with a result of checking for the detected waveform, that information indicating that it is necessary to perform some processing before starting signal processing is stored, the signal processor 163 further refers to the processing detail storing part 165 to determine whether it is inferred that audible noise has already been generated (step S109).

If, on the basis of a result of the determination, it is inferred that audible noise has already been generated, the signal processor 163 acquires, from the buffer 151, a past sound signal containing noise, on the basis of a delay time and an address in the buffer 151 notified by the delay time determining part 159 (step S111). Then, the signal processor 163 performs appropriate noise removal processing on the acquired sound signal (step S113).

If, on the basis of a result of the determination, it is inferred that audible noise will be generated after a predetermined period of time has passed, the signal processor 163 waits until information indicating that the predetermined period of time has passed is acquired from the counter control part 157, and performs appropriate noise removal processing after the predetermined period of time has passed (step S115).

After noise removal processing is performed on the sound signal, the signal processor 163 records the processed sound signal into the signal recording unit 103 (step S117).

With the use of the above-described processing method, noise removal processing optimal for the moving state of the signal recording unit 103 and the transition in the movement of the signal recording unit 103 at a certain time inferred on the basis of a detected current can be performed. In addition, by performing noise removal processing during a minimum necessary period of time, noise caused by a movement of the signal recording unit 103 can be removed with a small amount of electric power and less signal degradation.

As described above, in the signal processing device 10 and the signal processing method according to the above-described embodiments, with the use of a unit configured to detect a current supplied to the signal recording unit 103, the moving state of the signal recording unit 103 can be estimated. Furthermore, since a moving state can be estimated only in accordance with detection of a current, the cost of a circuit necessary for estimation of the moving state of the signal recording unit 103 can be reduced compared with a signal processing method of the related art.

In addition, in the signal processing device 10 and the signal processing method according to the above-described embodiments, the position of noise can be estimated with high accuracy in terms of time. Thus, processing for noise removal can be minimized, thereby suppressing degradation in the sound quality.

In addition, since the correlation among a current value, a change in the current value, and audible noise is thoroughly analyzed and a more elaborate design is made for an algorithm for removing audible noise, an accurate time for removing an individual noise can be generated, irrespective of whether the noise is generated in a steady or unsteady manner.

The preferred embodiments of the present invention have been described above with reference to the drawings. However, needless to say, the present invention is not limited to any of the above-described embodiments. It is obvious that persons skilled in the art can easily make various changes and modifications to the present invention without departing from the scope of the claims. It should also be understood that those changes and modifications fall within the technical scope of the present invention.

For example, although a case where a time at which processing for removing audible noise is started is estimated by detecting a temporal change in the current supplied to the signal recording unit 103 has been described in the above-described embodiments, a time at which processing for removing audible noise is started may be estimated by detecting a temporal change in the voltage applied to the signal recording unit 103.

It should be understood by those skilled in the art that various modifications, combinations, sub-combinations and alterations may occur depending on design requirements and other factors insofar as they are within the scope of the appended claims or the equivalents thereof.

What is claimed is:

1. A signal processing device comprising:
    a signal recording unit including an actuator that is driven by a current supplied from a power source and that has a possibility of generating audible noise caused by the driving, the signal recording unit being configured to record the sound signal therein;
    a sound pickup unit configured to pick up sound including audible noise generated by the signal recording unit and convert the sound into a sound signal;
    a current detecting unit configured to detect the magnitude of the current supplied to the signal recording unit and a temporal change in the current supplied to the signal recording unit; and
    a signal processing unit configured to determine, on the basis of at least one of the detected magnitude of the current and the detected temporal change in the current, whether the audible noise has been generated and perform when it is determined that the audible noise has been generated, noise removal processing for removing the audible noise from the sound signal, which contains the audible noise.

2. The signal processing device according to claim 1, wherein the signal processing unit determines, on the basis of a determination of whether a waveform indicating the detected temporal change in the current has a specific shape, whether the audible noise has been generated.

3. The signal processing device according to claim 2, wherein the signal processing unit fixes, on the basis of a time at which the waveform having the specific shape is detected, a removal processing start time at which the noise removal processing is started, and wherein the signal processing unit performs the noise removal processing on the sound signal containing the audible noise after the removal processing start time.

4. The signal processing device according to claim 3, wherein the signal processing unit includes a buffer in which the sound signal is stored for a predetermined period of time, and wherein in a case that the removal processing start time is set before the time at which the waveform having the specific shape is detected, the signal processing unit performs the noise removal processing on the sound signal stored in the buffer.

5. The signal processing device according to claim 2, wherein the signal processing unit includes a processing detail storing part in which details of the noise removal processing corresponding to the waveform having the specific shape are stored in association with the waveform having the specific shape, and wherein the signal processing unit changes, in accordance with the detected waveform having the specific shape, the details of the noise removal processing to be performed on the sound signal containing the audible noise.

6. The signal processing device according to claim 5, wherein the length of a period during which the noise removal processing is to be performed is stored, in association with the waveform having the specific shape, in the processing detail storage part, and wherein the signal processing unit performs the noise removal processing during a period from the removal processing start time to an end time of the period during which the noise removal processing is to be performed.

7. The signal processing device according to claim 1, wherein the signal processing unit removes, from the sound signal containing the audible noise, a signal component having a specific frequency by using one of a low-pass filter, a high-pass filter, and a band-pass filter.

8. The signal processing device according to claim 1, wherein the signal processing unit replaces a portion of the sound signal containing the audible noise with a portion that is different from the portion of the sound signal containing the audible noise.

9. A signal processing method for removing, from a sound signal to be recorded in a signal recording unit including an actuator that is driven by a current supplied from a power source and that has a possibility of generating audible noise caused by the driving, the audible noise, the method comprising the steps of:
    picking up sound including audible noise generated by the signal recording unit and converting the sound into the sound signal;
    detecting the magnitude of the current supplied to the signal recording unit and a temporal change in the current supplied to the signal recording unit; and
    determining, on the basis of at least one of the detected magnitude of the current and the detected temporal change in the current, whether the audible noise has been generated and removing, when it is determined that the audible noise has been generated, the audible noise from the sound signal, which contains the audible noise.

10. A non-transitory computer-readable medium having stored thereon a program for causing a computer to function as a signal processing device configured to remove, from a sound signal recorded in a signal recording unit including an actuator that is driven by a current supplied from a power source and that has a possibility of generating audible noise caused by the driving, the audible noise, comprising the functions of:
    picking up sound including audible noise generated by the signal recording unit and converting the sound into the sound signal;
    detecting the magnitude of the current supplied to the signal recording unit and a temporal change in the current supplied to the signal recording unit; and
    determining, on the basis of at least one of the detected magnitude of the current and the detected temporal change in the current, whether the audible noise has been generated and removing, when it is determined that the audible noise has been generated, the audible noise from the sound signal, which contains the audible noise.

* * * * *